(12) United States Patent
Miyata et al.

(10) Patent No.: US 12,291,110 B2
(45) Date of Patent: May 6, 2025

(54) POWER SOURCE SYSTEM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Seiya Miyata, Yokkaichi (JP); Masayoshi Hirota, Yokkaichi (JP); Takafumi Kawakami, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 366 days.

(21) Appl. No.: 17/759,659

(22) PCT Filed: Jan. 25, 2021

(86) PCT No.: PCT/JP2021/002388
§ 371 (c)(1),
(2) Date: Jul. 28, 2022

(87) PCT Pub. No.: WO2021/153484
PCT Pub. Date: Aug. 5, 2021

(65) Prior Publication Data
US 2023/0062219 A1 Mar. 2, 2023

(30) Foreign Application Priority Data
Jan. 31, 2020 (JP) .................................. 2020-015317

(51) Int. Cl.
*B60L 3/00* (2019.01)
*H02J 7/00* (2006.01)

(52) U.S. Cl.
CPC .......... *B60L 3/0046* (2013.01); *H02J 7/0068* (2013.01); *H02J 2207/20* (2020.01)

(58) Field of Classification Search
CPC ...... B60L 3/0046; B60L 3/0092; B60L 53/22; H02J 7/0068; H02J 2207/20; H02J 7/1438;
(Continued)

(56) References Cited

U.S. PATENT DOCUMENTS 6,297,616 B1    10/2001   Kubo et al.
11,056,909 B2 *   7/2021   Ghosh ............... H02M 3/33523
(Continued)

FOREIGN PATENT DOCUMENTS

JP     2014-212643 A    11/2014

OTHER PUBLICATIONS

International Search Report, Application No. PCT/JP2021/002388, mailed Mar. 23, 2021. ISA/Japan Patent Office.

*Primary Examiner* — Daniel Cavallari
*Assistant Examiner* — Terrence R Willoughby
(74) *Attorney, Agent, or Firm* — Honigman LLP

(57) ABSTRACT

A power source system includes a plurality of output circuits electrically connected to a plurality of second coils on a second side of a transformer unit, and a selection circuit to which power is supplied from the plurality of output circuits. Each of the plurality of output circuits is electrically connected to each of the plurality of second coils on the second side, and outputs DC power to the selection circuit based on AC power of the second coil on the second side. The selection circuit selects a supply destination of the power from a first conductive path and a second conductive path.

18 Claims, 6 Drawing Sheets

(58) Field of Classification Search
CPC ...... H02J 2310/48; Y02T 10/70; Y02T 10/92; H02M 3/28
See application file for complete search history.

(56) References Cited

U.S. PATENT DOCUMENTS

| | | | |
|---|---|---|---|
| 2012/0235626 A1* | 9/2012 | Oh | H02M 3/3353 320/103 |
| 2012/0319469 A1* | 12/2012 | Krenz | H02J 3/007 307/9.1 |
| 2014/0070812 A1* | 3/2014 | Yokoi | A61B 6/56 324/322 |
| 2016/0280081 A1* | 9/2016 | Lasagni | B60L 50/51 |
| 2019/0252987 A1 | 8/2019 | Yamano | |
| 2019/0341804 A1* | 11/2019 | Coleman | H02J 9/06 |
| 2020/0412237 A1* | 12/2020 | Dai | H02M 3/155 |

\* cited by examiner

POWER SOURCE SYSTEM

CROSS-REFERENCE TO RELATED APPLICATIONS

This application is the U.S. national stage of PCT/JP2021/002388 filed on Jan. 25, 2021, which claims priority of Japanese Patent Application No. JP 2020-015317 filed on Jan. 31, 2020, the contents of which are incorporated herein.

TECHNICAL FIELD

The present disclosure relates to a power source system.

BACKGROUND

A high-voltage battery serving as a power source for driving a motor for vehicle travel and a low-voltage battery serving as a power source for driving auxiliary equipment such as wipers and headlights have been mounted in electric vehicles such as plug-in hybrid vehicles and electric automobiles. Note that in the following description, a plug-in hybrid vehicle is also referred to as a PHEV (Plug-in Hybrid Electric Vehicle). An electric vehicle is also referred to as an EV (Electric Vehicle). These PHEVs and EVs are also equipped with in-vehicle chargers that enable power supply from a commercial power source, a quick charging stand, or the like. JP 2014-212643A discloses an example of a power source system mounted in this type of electric vehicle. The power source system disclosed in JP 2014-212643A includes a plug-in charger 73 that receives a supply of power from an external power source EP, and power can be supplied to a main battery MB corresponding to a high-voltage battery via the plug-in charger 73. Furthermore, a DC/DC converter is provided between the main battery MB and an auxiliary battery AB corresponding to the low-voltage battery, in addition to the plug-in charger 73.

In the power source system disclosed in JP 2014-212643A, there is only one path for supplying power to the auxiliary load 30 corresponding to the low-voltage load, and a plurality of power paths to the low-voltage load are not ensured. Accordingly, with this power source system, there is concern about redundancy.

The present disclosure provides a configuration that can realize a more compact power source system that can increase the redundancy of power supply to a load.

SUMMARY

A power source system, which is one of the present disclosures, is a power source system to be used in an in-vehicle system including a first conductive path, which is a path for supplying power to a first load, a second conductive path, which is a path for supplying power to a second load, and a power storage unit, the power source system including: an inverter unit including one or more inverter circuits that convert DC power obtained based on power supplied from a power source that is different from the power storage unit into AC power, and supply the AC power; a transformer unit including one or more first coils to which AC power is supplied from the inverter unit and a plurality of second coils; a converter circuit that is electrically connected to a second coil on a first side of the plurality of second coils, and is configured to convert AC power of the second coil on the first side into DC power and supply the DC power to the power storage unit side; a plurality of output circuits that are electrically connected to a plurality of second coils on a second side that are different from the second coil on the first side among the plurality of second coils; and a selection circuit to which power is supplied from the plurality of output circuits, in which each of the plurality of output circuits is electrically connected to each of the plurality of second coils on the second side and outputs DC power based on the AC power of the second coil on the second side, and the selection circuit selects a supply destination of the power from the first conductive path and the second conductive path.

Advantageous Effects

The power source system, which is one of the present disclosures, can realize a more compact configuration that can increase the redundancy of power supply to a load.

DETAILED DESCRIPTION OF PREFERRED EMBODIMENTS

Figure 1:
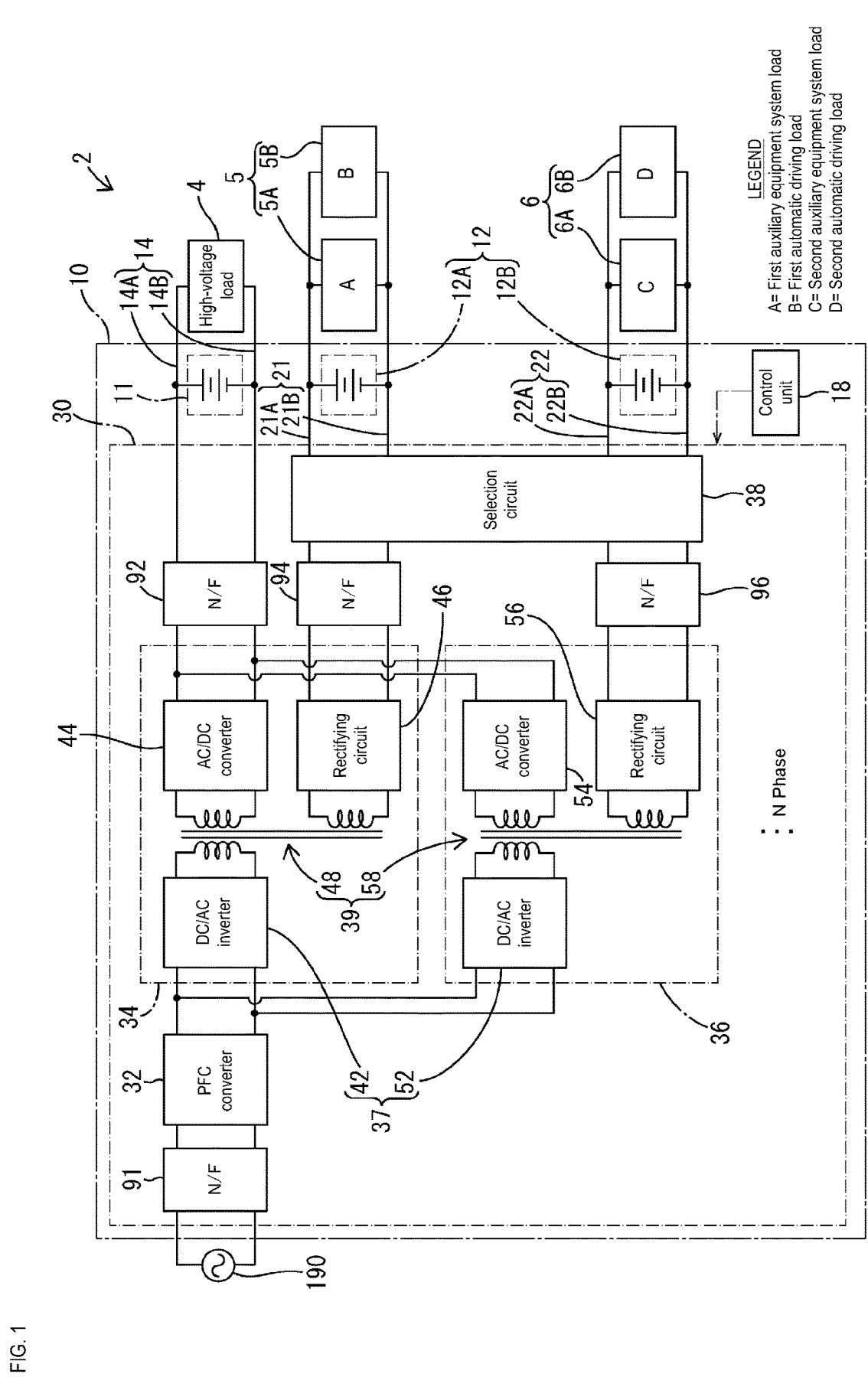
FIG. 1 is a block diagram schematically illustrating an in-vehicle system including a power source system according to a first embodiment of the present disclosure.

Hereinafter, embodiments of the present disclosure will be listed and illustrated. Note that the first to the eleventh aspects illustrated below may be combined in any manner as long as there is no inconsistency.

First Aspect

A power source system in accordance with the first aspect, is a power source system to be used in an in-vehicle system including a first conductive path, which is a path for supplying power to a first load, a second conductive path, which is a path for supplying power to a second load, and a power storage unit, the power source system including: an inverter unit including one or more inverter circuits that convert DC power obtained based on power supplied from a power source that is different from the power storage unit into AC power, and supply the AC power; a transformer unit including one or more first coils to which AC power is supplied from the inverter unit and a plurality of second coils; a converter circuit that is electrically connected to a second coil on a first side of the plurality of second coils, and is configured to convert AC power of the second coil on the first side into DC power and supply the DC power to the power storage unit side; a plurality of output circuits that are electrically connected to a plurality of second coils on a second side that are different from the second coil on the first side among the plurality of second coils; and a selection circuit to which power is supplied from the plurality of output circuits, in which each of the plurality of output circuits is electrically connected to each of the plurality of second coils on the second side and outputs DC power based on the AC power of the second coil on the second side, and the selection circuit selects a supply destination of the power from the first conductive path and the second conductive path.

In the power source system of according to the first aspect, power is supplied to the selection circuit from a plurality of output circuits, and the selection circuit can select the power supply destination from the first conduction path and the second conduction path. That is, the above-described power source system can switch between an operation of individually maintaining the power supply to the first load and an operation of individually maintaining the power supply to the second load. Therefore, the above-described power source system can increase the redundancy of the power supply to the load. Moreover, in the above-described power source system, some components used for charging the power storage unit and some components used for supplying power to the first load and the second load can be used in common, and therefore it is possible to realize a more compact configuration that can improve redundancy.

Second Aspect

In a second aspect, the power source system according to the first aspect, in which each of the plurality of output circuits is a rectifying circuit that rectifies the AC power supplied from the second coil on the second side.

In the power source system according to the second aspect, since each of the plurality of output circuits is constituted by a rectifier circuit, it is possible to realize an even more compact configuration that can perform charging of the power storage unit and supply of power to the first load and the second load while using some components in common.

Third Aspect

In a third aspect, the power source system according to the first or the second aspect, further includes a selection control unit configured to control a selection operation of the selection circuit, in which if a first condition is satisfied, the selection control unit controls the selection circuit in a state where power supply to the second conductive path is cut off and a state where power supply to the first conductive path is allowed, and if a second condition is satisfied, the selection control unit controls the selection circuit in a state where power supply to the first conductive path is cut off and a state where power supply to the second conductive path is allowed.

The power source system according to the third aspect can perform an operation of selectively supplying power to only the first conductive path among the first conductive path and the second conductive path if the first condition is satisfied. Also, the power source system can perform an operation of selectively supplying power to only the second conductive path among the first conductive path and the second conductive path if the second condition is satisfied.

Fourth Aspect

In a fourth aspect, the power source system according to the third aspect, further includes: a first abnormality detection unit configured to detect an abnormality on the first conductive path side; and a second abnormality detection unit configured to detect an abnormality on the second conductive path side, in which if the second abnormality detection unit detects an abnormality on the second conductive path side, the selection control unit controls the selection circuit in a state where power supply to the second conductive path is cut off and a state where power supply to the first conductive path is allowed, and if the first abnormality detection unit detects an abnormality on the first conductive path side, the selection control unit controls the selection circuit in a state where power supply to the first conductive path is cut off and a state where power supply to the second conductive path is allowed.

The power source system according to the fourth aspect can perform an operation of selectively supplying power to only the first conductive path among the first conductive path and the second conductive path in the event of an abnormality on the second conductive path side. Accordingly, this power source system can maintain the power supply to the first load while suppressing the influence of an abnormality on the first conductive path side in the event of an abnormality on the second conductive path side. Also, the power source system can perform an operation of selectively supplying power to only the second conductive path among the first conductive path and the second conductive path in the event of an abnormality on the first conductive path side. Accordingly, this power source system can maintain the power supply to the second load while suppressing the influence of the abnormality on the second conductive path side in the event of an abnormality on the first conductive path side.

Fifth Aspect

In a fifth aspect, the power source system according to any one of the first to the fourth aspects, in which the inverter unit includes a plurality of the inverter circuits, the transformer unit includes a plurality of transformers including the first coil and the second coil on the second side, each of the inverter circuits is electrically connected to the first coil of each of the transformers and supplies AC power to each of the first coils, and the second coil on the second side of each of the transformers is electrically connected to each of the output circuits and supplies AC power to each of the output circuits.

In the power source system according to the fifth aspect, if an abnormality occurs in any of the inverter circuits, transformers, output circuits, or the like, power supply to the first conductive path side or the second conductive path side can be maintained using the inverter circuits, transformers, and output circuits of the path in which no abnormality has occurred. Accordingly, the above-described power source system can further improve the redundancy of power supply to the first conductive path or the second conductive path.

Sixth Aspect

In accordance with a sixth aspect, the power source system according to the fifth aspect, further includes a plurality of the converter circuits, in which each of the plurality of transformers includes the second coil on the first side, and each of the second coils on the first side is electrically connected to each of the converter circuits and supplies AC power to each of the converter circuits.

In the power source system according to the sixth aspect, if an abnormality occurs in any of the inverter circuits, transformers, converter circuits, and the like, power supply to the power storage unit side can be maintained using the inverter circuits, transformers, and converter circuits of the path where no abnormality has occurred. Accordingly, the above-described power source system can further improve the redundancy of the power supply to the power storage unit side.

Seventh Aspect

In accordance with a seventh aspect, the power source system according to the sixth aspect, further including: a plurality of power supply circuits including the inverter circuit, the transformer, the converter circuit, and the output circuit; an abnormal circuit detection unit configured to, if any of the plurality of power supply circuits is abnormal, detect the abnormal power supply circuit; and a stopping control unit configured to stop operation of the abnormal power supply circuit.

Since the power source system of according to the seventh aspect is provided with a plurality of power supply circuits, it is possible to ensure a plurality of charging paths to the power storage unit and to ensure a plurality of power supply paths to the first load and the second load. Furthermore, the above-described power source system can achieve protection by stopping the power supply circuit if any of the power supply circuits becomes abnormal. Moreover, even if any of the power supply circuits is stopped, the power source system can operate the other power supply circuits to perform charging of the power storage unit and power supply to the first load or the second load.

Eighth Aspect

In accordance with an eighth aspect, the power source system according to any one of the first to the seventh aspects, further include: a selection control unit configured to control a selection operation of the selection circuit; and an output abnormality detection unit configured to, if an output abnormality has occurred in any of the plurality of output circuits, detect the output circuit in which the output abnormality has occurred, in which the selection control unit controls the selection circuit so as to cut off a flow of current between the output circuit in which the output abnormal has occurred and the first conductive path and second conductive path, and allow a flow of current between the output circuit in which the output abnormality has not occurred and at least one of the first conductive path and the second conductive path.

If an output abnormality has occurred in any of the plurality of output circuits, the power source system according to the eighth aspect can protect the output circuit in which the output abnormality has occurred by electrically disconnecting it from the first conductive path and the second conductive path. On the other hand, the above-described power source system can allow current to flow between the output circuit in which no output abnormality has occurred and at least one of the first conductive path and the second conductive path, and can maintain power supply to at least one of the conductive paths.

Ninth Aspect

In accordance with a ninth aspect, the system according to any one the first to the eighth aspect, in which first relays are respectively arranged between each of the output circuits and the first conductive path, the selection circuit switches the circuit for supplying power to the first conductive path by switching on and off states of the plurality of first relays, second relays are respectively arranged between each of the output circuits and the second conductive path, and the selection circuit switches the circuit for supplying power to the second conductive path by switching the on and off states of the plurality of second relays.

In the power source system according to the ninth aspect, the configuration for switching between the operation of individually maintaining the power supply to the first load and the operation of individually maintaining the power supply to the second load is easily realized using the first relays and the second relays as main parts.

Tenth Aspect

In a tenth aspect, the power source system according to any one of the first to the ninth aspects, in which the first conductive path is a conductive path to which the first battery is electrically connected, and the second conductive path is a conductive path to which the second battery is electrically connected.

The power source system according to the tenth aspect can be suitably used as an in-vehicle system in which power can be supplied to the first battery and the first load via the first conductive path, and power can be supplied to the second battery and the second load via the second conductive path.

Eleventh Aspect

In an eleventh aspect, a vehicle includes the power source system according to any one of the first to the tenth aspects.

In the vehicle described in in the eleventh aspect, a more compact power source system capable of increasing the redundancy of power supply to the load is realized.

First Embodiment

FIG. 1 shows a power source system 10 according to a first embodiment of the present disclosure. The power source system 10 is configured as a power source system for a vehicle.

Configuration of Power Source System

Figure 2:
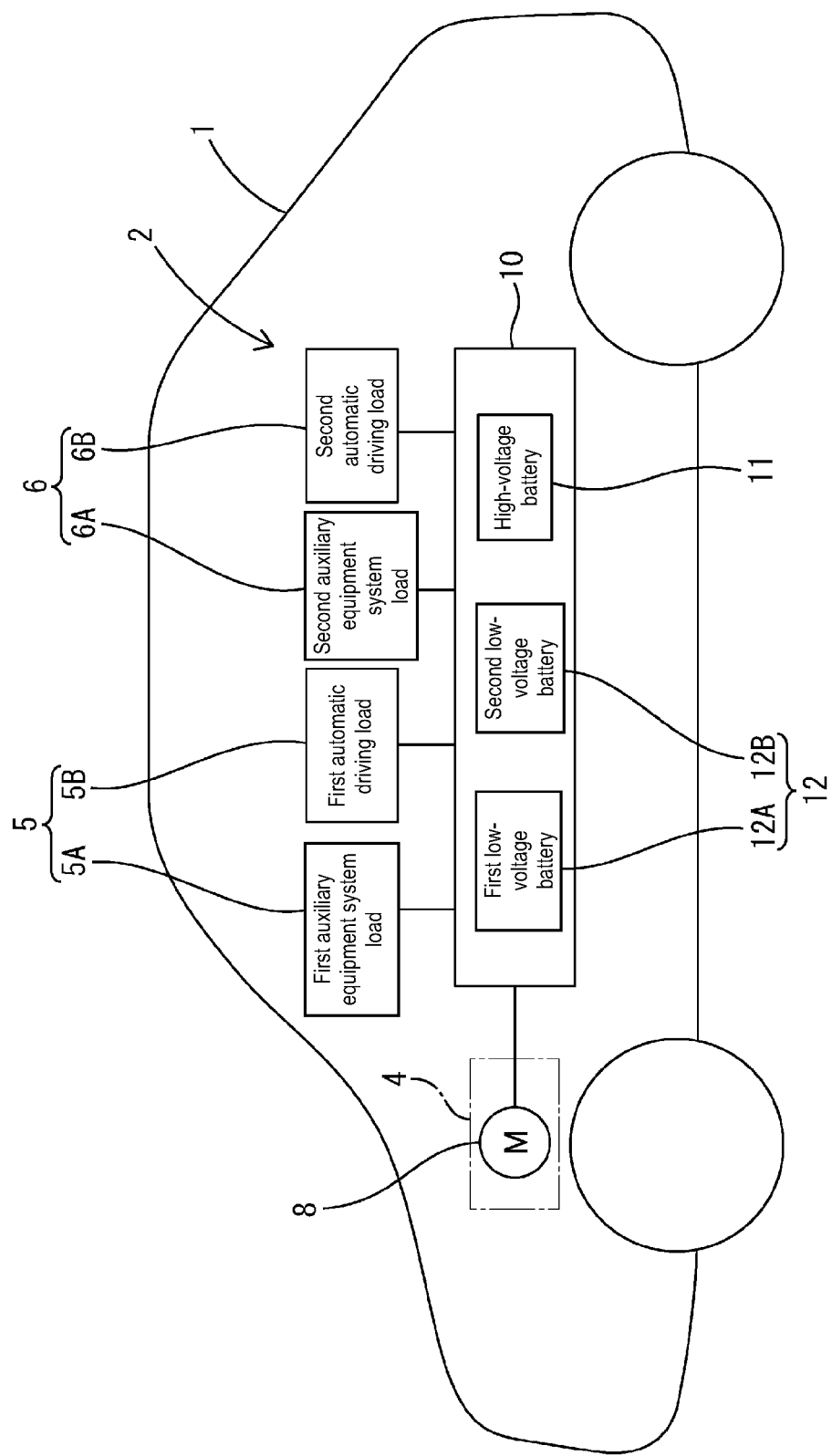
FIG. 2 is a schematic diagram schematically illustrating a vehicle equipped with the in-vehicle system of FIG. 1.

As shown in FIG. 2, the power source system 10 is used as a part of an in-vehicle system 2 mounted in a vehicle 1. The vehicle 1 is a vehicle in which the power source system 10 is mounted, and is, for example, a vehicle such as a PHEV or an EV. As shown in FIG. 2, the in-vehicle system 2 includes a power source system 10, a high-voltage load 4, a first load 5, a second load 6, and the like. The vehicle 1 has a connection terminal (not shown), and an external AC power source 190 (FIG. 1) can be electrically connected to the connection terminal. The power source system 10 can switch between a state in which the external AC power source 190 is electrically connected as shown in FIG. 1, and a state in which the external AC power source 190 is not connected.

As shown in FIG. 1, the power source system 10 includes a first conductive path 21, a second conductive path 22, a power supply unit 30, a control unit 18, a high-voltage battery 11, a low-voltage battery 12, and the like. The low-voltage battery 12 includes a first low-voltage battery 12A and a second low-voltage battery 12B.

The power source system 10 is a system that can charge the high-voltage battery 11, the first low-voltage battery 12A, and the second low-voltage battery 12B based on AC power supplied from the external AC power source 190 when the external AC power source 190 is connected to the vehicle 1. Also, the power source system 10 is a system capable of supplying power to the high-voltage load 4, the first load 5, and the second load 6 when the vehicle travels.

The high-voltage load 4 is a load that can operate by receiving a supply of power from the high-voltage battery 11. The high-voltage load 4 includes, for example, a drive unit 8 (FIG. 2) and a PCU (Power Control Unit) (not shown). This PCU is a device that converts the output power of the high-voltage battery 11 into power for driving the drive unit 8 and supplies the resulting power to the drive unit 8. This PCU includes, for example, an inverter, and generates alternating current (e.g., three-phase alternating current) from direct current and supplies the generated alternating current to the drive unit 8. The drive unit 8 is an electric drive device such as a main engine system motor. The drive unit 8 is a device that provides a driving force for rotating wheels of the vehicle 1 based on the power supplied from the high-voltage battery 11.

The first load 5 is a load that receives a supply of power from the first conductive path 21. The second load 6 is a load that receives a supply of power from the second conductive path 22. A first auxiliary equipment system load 5A corresponds to an example of the first load 5. A second auxiliary equipment system load 6A corresponds to an example of the second load 6. The first auxiliary equipment system load 5A and the second auxiliary equipment system load 6A are, for example, accessory devices needed for operating an engine and a motor. This accessory device is, for example, a starter motor, an alternator, a radiator cooling fan, or the like. The first auxiliary equipment system load 5A and the second auxiliary equipment system load 6A may include an electric power steering system, an electric parking brake, lighting, a wiper drive unit, a navigation device, and the like. The second auxiliary equipment system load 6A is a load capable of executing some or all of the functions of the first auxiliary equipment system load 5A if the function of the first auxiliary equipment system load 5A is stopped. The first auxiliary equipment system load 5A is a load capable of executing some or all of the functions of the second auxiliary equipment system load 6A if the function of the second auxiliary equipment system load 6A is stopped.

A first automatic driving load 5B corresponds to an example of the first load 5. A second automatic driving load 6B corresponds to an example of the second load 6. The first automatic driving load 5B and the second automatic driving load 6B are loads required for automatic driving. The first automatic driving load 5B and the second automatic driving load 6B include, for example, a sensing system such as a millimeter-wave radar and a stereo camera, a speed control system, an inter-vehicle distance control system, a steering control system, a lane departure prevention support system, and the like. The second automatic driving load 6B is a load that can execute some or all of the functions of the first automatic driving load 5B if the function of the first automatic driving load 5B is stopped. The first automatic driving load 5B is a load that can execute some or all of the functions of the second automatic driving load 6B if the function of the second automatic driving load 6B is stopped. Note that in FIG. 1, the first automatic driving load 5B and the first auxiliary equipment system load 5A are distinguished from each other, but they do not need to be distinguished from each other. For example, the first auxiliary equipment system load 5A may have a load belonging to the first automatic driving load 5B, and the first automatic driving load 5B may have a load belonging to the first auxiliary equipment system load 5A. Similarly, the second automatic driving load 6B and the second auxiliary equipment system load 6A do not need to be distinguished from each other. For example, the second auxiliary equipment system load 6A may have a load belonging to the second automatic driving load 6B, and the second automatic driving load 6B may have a load belonging to the second auxiliary equipment system load 6A.

In the present specification, the time when the vehicle travels includes, but is not limited to, a state in which the vehicle is moving. The time when the vehicle travels also includes a state where the vehicle moves when the accelerator is stepped on. The time when the vehicle travels includes a state in which power is supplied to any or all of the first load 5 and the second load 6 while the vehicle is stopped without moving. If the vehicle 1 is a PHEV, the time when the vehicle travels also includes an idling state of the engine.

The high-voltage battery 11 corresponds to an example of a power storage unit. The high-voltage battery 11 is configured to be chargeable and dischargeable. The high-voltage battery 11 outputs a high voltage (e.g., about 300 V) for driving the drive unit 8. The fully-charged output voltage of the high-voltage battery 11 is higher than the fully-charged output voltage of the first low-voltage battery 12A and is higher than the fully-charged output voltage of the second low-voltage battery 12B. The high-voltage battery 11 may be constituted by a lithium ion battery or another type of storage battery. The positive electrode of the high-voltage battery 11 is electrically connected to a conductive path 14A, and the negative electrode of the high-voltage battery 11 is electrically connected to a conductive path 14B.

The first conductive path 21 is a path for supplying power to the first load 5. The first conductive path 21 is electrically connected to the first auxiliary equipment system load 5A, the first automatic driving load 5B, and the first low-voltage battery 12A. The first conductive path 21 includes a conductive path 21A that is electrically connected to the positive electrode of the first low-voltage battery 12A and a conductive path 21B that is electrically connected to the negative electrode of the first low-voltage battery 12A.

The first low-voltage battery 12A corresponds to an example of a first battery. The first low-voltage battery 12A is configured to be chargeable and dischargeable. The first low-voltage battery 12A applies an output voltage between the conductive paths 21A and 21B of the first conductive path 21 to supply power to the first auxiliary equipment system load 5A and the first automatic driving load 5B. The first low-voltage battery 12A may also be constituted by a lead storage battery or another type of storage battery. The first low-voltage battery 12A applies a predetermined voltage (e.g., 12 V) to the first conductive path 21 when fully charged.

The second conductive path 22 is a path for supplying power to the second load 6. The second conductive path 22 is electrically connected to the second auxiliary equipment system load 6A, the second automatic driving load 6B, and the second low-voltage battery 12B. The second conductive path 22 includes a conductive path 22A that is electrically connected to the positive electrode of the second low-voltage battery 12B and a conductive path 22B that is electrically connected to the negative electrode of the second low-voltage battery 12B.

The second low-voltage battery 12B corresponds to an example of a second battery. The second low voltage battery 12B is configured to be chargeable and dischargeable. The second low-voltage battery 12B applies an output voltage between the conductive paths 22A and 22B of the second conductive path 22 to supply power to the second auxiliary equipment system load 6A and the second automatic driving load 6B. The second low-voltage battery 12B may also be constituted by a lead storage battery or another type of storage battery. The second low-voltage battery 12B applies a predetermined voltage (e.g., 12 V) to the second conductive path 22 when fully charged.

The control unit 18 is a device that performs various types of control on the devices in the in-vehicle system 2. The control unit 18 may also be constituted by a plurality of electronic control devices, or may be constituted by a single electronic control device. The control unit 18 is a device capable of controlling the power supply unit 30.

If the vehicle in which the power source system 10 is mounted is an EV, the EV can travel using the configurations shown in FIGS. 1 and 2. If the vehicle in which the power source system 10 is mounted is a PHEV, the vehicle includes an engine in addition to the drive unit 8. Accordingly, if the vehicle is a PHEV, the PHEV can travel due to the engine and the drive unit 8 operating in cooperation with each other.

The power supply unit 30 mainly includes a PFC (Power Factor Correction) converter 32, power supply circuits 34 and 36, a selection circuit 38, noise filter units 91, 92, 94, and 96, and the like. The noise filter units 91, 92, 94, and 96 are portions that remove noise from the path. Note that three or more power supply circuits 34 and 36 having the same configuration may also be provided. Hereinafter, a configuration in which two power supply circuits 34 and 36 are provided will be described as a typical example.

Figure 3:
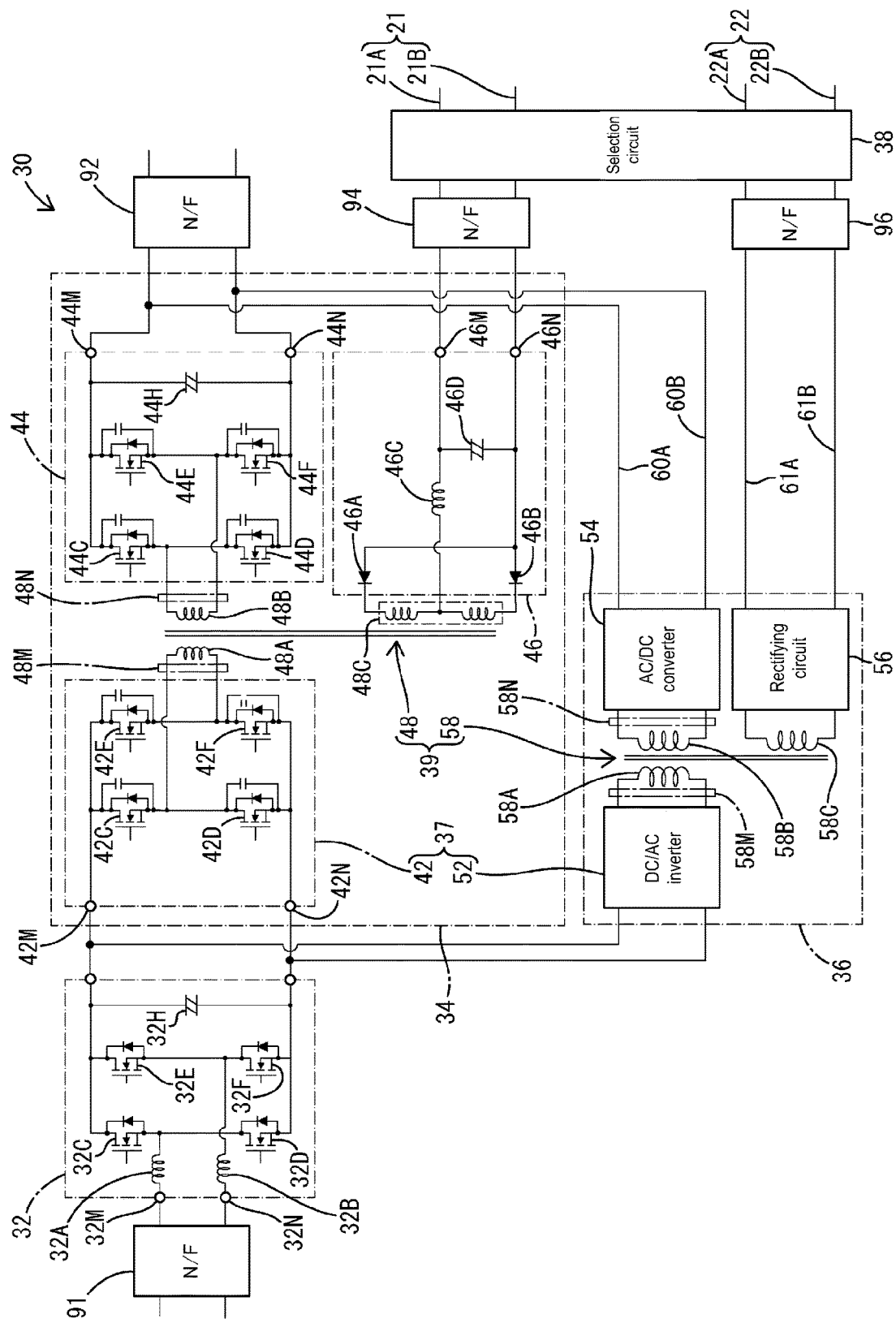
FIG. 3 is a circuit diagram illustrating a specific configuration of a power supply unit in the power source system of FIG. 1.

The power supply unit 30 is configured as a vehicle-mounted charging device. The power supply unit 30 functions as an OBC (On Board Charger). If the external AC power source 190 (e.g., a commercial power source), which is outside of the vehicle 1, is connected to the vehicle 1, the power supply unit 30 can perform an operation of charging the high-voltage battery 11 that functions as a main power source based on the power supplied from the external AC power source 190. If the external AC power source 190 is connected to the vehicle 1, the power supply unit 30 can also perform an operation of charging the low-voltage battery 12 based on the power supplied from the external AC power source 190. FIG. 3 illustrates a specific circuit of the power supply unit 30.

The PFC converter 32 functions as a power factor improving circuit and is configured as an AC/DC converter that performs power conversion between AC power and DC power. The PFC converter includes inductors 32A and 32B and switch elements 32C, 32D, 32E, and 32F that constitute a full bridge circuit. The two input ends of the full bridge circuit constituted by the switch elements 32C, 32D, 32E, and 32F are electrically connected to inductors 32A and 32B, respectively. The two output ends of this full bridge circuit are electrically connected to both ends of a capacitor 32H. The PFC converter 32 generates a DC voltage from the AC voltage input from the external AC power source 190 to the terminals 32M and 32N at the time of external charging, and applies the DC voltage to both ends of the capacitor 32H. In response to the PFC converter 32 applying the DC voltage to both ends of the capacitor 32H, a DC voltage is also applied to the terminals 42M and 42N of the inverter circuit 42 and a pair of input terminals (not shown) in the inverter circuit 52.

The inverter unit 37 includes a plurality of inverter circuits 42 and 52 that convert DC power based on power supplied from a power source different from the high-voltage battery 11 (e.g., the external AC power source 190) into AC power and supply the resulting AC power.

The inverter circuits 42 and 52 function as DC/AC inverters, and function as power conversion circuits that convert DC power input from the PFC converter 32 into AC power and output the resulting AC power. The inverter circuit 42 includes the switch elements 42C, 42D, 42E, and 42F that constitute a full bridge circuit. One of the two output terminals of the full bridge circuit constituted by the switch elements 42C, 42D, 42E, and 42F is electrically connected to one end of the first end portion 48M (both ends of the coil 48A) of the first transformer 48. The other terminal of the above-described two output terminals is electrically connected to the other end of the first end portion 48M. The inverter circuit 42 converts the DC voltage input from the PFC converter 32 into an AC voltage, and outputs the AC voltage to the first end portion 48M of the transformer 48.

The inverter circuit 52 has the same configuration as the inverter circuit 42. The inverter circuit 52 converts the DC voltage input from the PFC converter 32 to the pair of input terminals of the inverter circuit 52 into an AC voltage, and outputs the AC voltage to the first end portion 58M of the transformer 58.

The transformer unit 39 has a plurality of transformers 48 and 58. The transformer unit 39 includes a plurality of first coils 48A and 58A to which AC power is supplied from the inverter unit 37, and a plurality of second coils 48B, 48C, 58B, and 58C. The plurality of first coils 48A and 58A can function as primary coils. When the plurality of first coils 48A and 58A function as the primary coils, the plurality of second coils 48B, 48C, 58B, and 58C may function as secondary coils.

The transformer 48 includes a first coil 48A and a plurality of second coils 48B and 48C. The inverter circuit 42 is electrically connected to the first coil 48A of the transformer 48 and supplies AC power to the first coil 48A. The second coil 48B of the transformer 48 corresponds to an example of the second coil on the first side. The second coil 48B is electrically connected to the converter circuit 44 and supplies AC power to the converter circuit 44. The second coil 48C of the transformer 48 corresponds to an example of the second coil on the second side. The second coil 48C is electrically connected to the output circuit 46 and supplies AC power to the output circuit 46.

The transformer 58 includes a first coil 58A and a plurality of second coils 58B and 58C. The inverter circuit 52 is electrically connected to the first coil 58A of the transformer 58 and supplies AC power to the first coil 58A. The second coil 58B of the transformer 58 corresponds to an example of the second coil on the first side. The second coil 58B is electrically connected to the converter circuit 54 and supplies AC power to the converter circuit 54. The second coil 58C of the transformer 58 corresponds to an example of the second coil on the second side. The second coil 58C is electrically connected to the output circuit 56 and supplies AC power to the output circuit 56.

The converter circuits 44 and 54 function as a bi-directional AC/DC converter and have a function of converting AC power and DC power in both directions. If AC power is supplied to the second coil 48B, the converter circuit 44 can perform a first operation so as to convert the AC power supplied to the second coil 48B into DC power and supply the resulting DC power to the high-voltage battery 11 (power storage unit) side. The converter circuit 44 performs the above-described first operation so as to convert the output voltage (AC voltage) applied to the second end portion 48N (both ends of the coil 48B) of the transformer 48 into a DC voltage, and apply the DC voltage to the terminals 44M and 44N. The terminal 44M is a conductive path that can be electrically connected to the positive electrode of the high-voltage battery 11, and the terminal 44N is a conductive path that can be electrically connected to the negative electrode of the high-voltage battery 11. Note that a relay or fuse (not shown) may also be interposed between the terminals 44M and 44N and the high-voltage battery 11. If DC power is supplied from the high-voltage battery 11 (FIG. 1) to the terminals 44M and 44N, the converter circuit 44 can perform a second operation so as to convert the DC power into AC power and supply the resulting AC power to the second coil 48B of the transformer 48. The converter circuit 44 performs the above-described second operation so as to convert the DC voltage applied to the terminals 44M and 44N into an AC voltage, and apply the AC voltage between both ends of the second end portion 48N. The converter circuit 44 includes switch elements 42C, 42D, 42E, and 42F that constitute a full bridge circuit, and a capacitor 44H. One of the pair of terminals of the full bridge circuit constituted by the switch elements 42C, 42D, 42E, and 42F is electrically connected to one side of the second end portion 48N (one end of the second coil 48B). The other of the above-described pair of terminals is electrically connected to the other side of the second end portion 48N (the other end of the second coil 48B).

The converter circuit 54 has the same configuration as the converter circuit 44. The converter circuit 54 is electrically connected to the second coil 58B. The second coil 58B corresponds to an example of the second coil on the first side. The converter circuit 54 functions as a bi-directional AC/DC converter and has a function of converting AC power and DC power in both directions. If the first coil 58A functions as a primary coil and the AC power is supplied to the second coil 58B, the converter circuit 54 can perform a first operation so as to convert the AC power supplied to the second coil 58B into DC power and supply the resulting DC power to the high-voltage battery 11 (power storage unit) side. The converter circuit 54 performs the above-described first operation so as to convert the output voltage (AC voltage) applied to the second end portion 58N of the transformer 58 into a DC voltage and apply the resulting DC voltage between the conductive paths 60A and 60B. The conductive path 60A is a conductive path that can be electrically connected to the conductive path 14A. The conductive path 60B is a conductive path that can be electrically connected to the conductive path 14B. If DC power is supplied from the high-voltage battery 11, the converter circuit 54 can perform a second operation so as to convert the DC power into AC power and supply the resulting AC power to the second coil 58B of the transformer 58. The converter circuit 54 performs the above-described second operation so as to convert the DC voltage applied between the conductive paths 60A and 60B based on the power supply from the high-voltage battery 11 into an AC voltage, and apply the AC voltage to both ends of the second end portion 58N (both ends of the second coil 58B).

The output circuits 46 and 56 are configured as rectifier circuits. The output circuit 46 is electrically connected to a second coil 48C (second coil on the second side) that is different from the second coil 48B (second coil on the first side) among the plurality of second coils 48B and 48C. Each of the plurality of output circuits 46 and 56 is electrically connected to each of the second coils 48C and 58C (multiple second coils on the second side) and outputs DC power based on the AC power of the second coils 48C and 58C.

The output circuit 46 is electrically connected to the second coil 48C and operates so as to output DC power based on the AC power of the second coil 48C. Specifically, the output circuit 46 rectifies and smooths the AC voltage input from the second coil 48C, and applies a DC voltage between the terminals 46M and 46N. In the example of FIG. 3, the output circuit 46 is configured as a full-wave rectifier circuit including diodes 46A and 46B, an inductor 46C, and a capacitor 46D. The second coil 48C connected to the input side of the output circuit 46 is a center tap coil. In the pair of output terminals 46M and 46N of the output circuit 46, one output terminal 46M can be electrically connected to a conductive path 38X of the selection circuit 38. The other output terminal 46N can be electrically connected to a conductive path 38Z of the selection circuit 38. The output voltage from the output circuit 46 is applied between the conductive paths 38X and 38Z of the selection circuit 38.

The output circuit 56 is configured in the same manner as the output circuit 46. The output circuit 56 is electrically connected to the second coil 58C (second coil on the second side), which is different from the second coil 58B (second coil on the first side) among the plurality of second coils 58B and 58C. The output circuit 56 is electrically connected to the second coil 58C and operates so as to output DC power based on the AC power of the second coil 58C. Specifically, the output circuit 56 rectifies and smooths the AC voltage input from the second coil 58C, and applies a DC voltage between the conductive paths 61A and 61B. The terminal on the high potential side of the pair of output terminals of the output circuit 56 can be electrically connected to the conductive path 38Y of the selection circuit 38 via the conductive path 61A. The terminal on the low potential side of the pair of output terminals of the output circuit 46 can be electrically connected to the conductive path 38Z of the selection circuit 38 via the conductive path 61B. The output voltage from the output circuit 56 is applied between the conductive paths 38Y and 38Z of the selection circuit 38.

Figure 4:
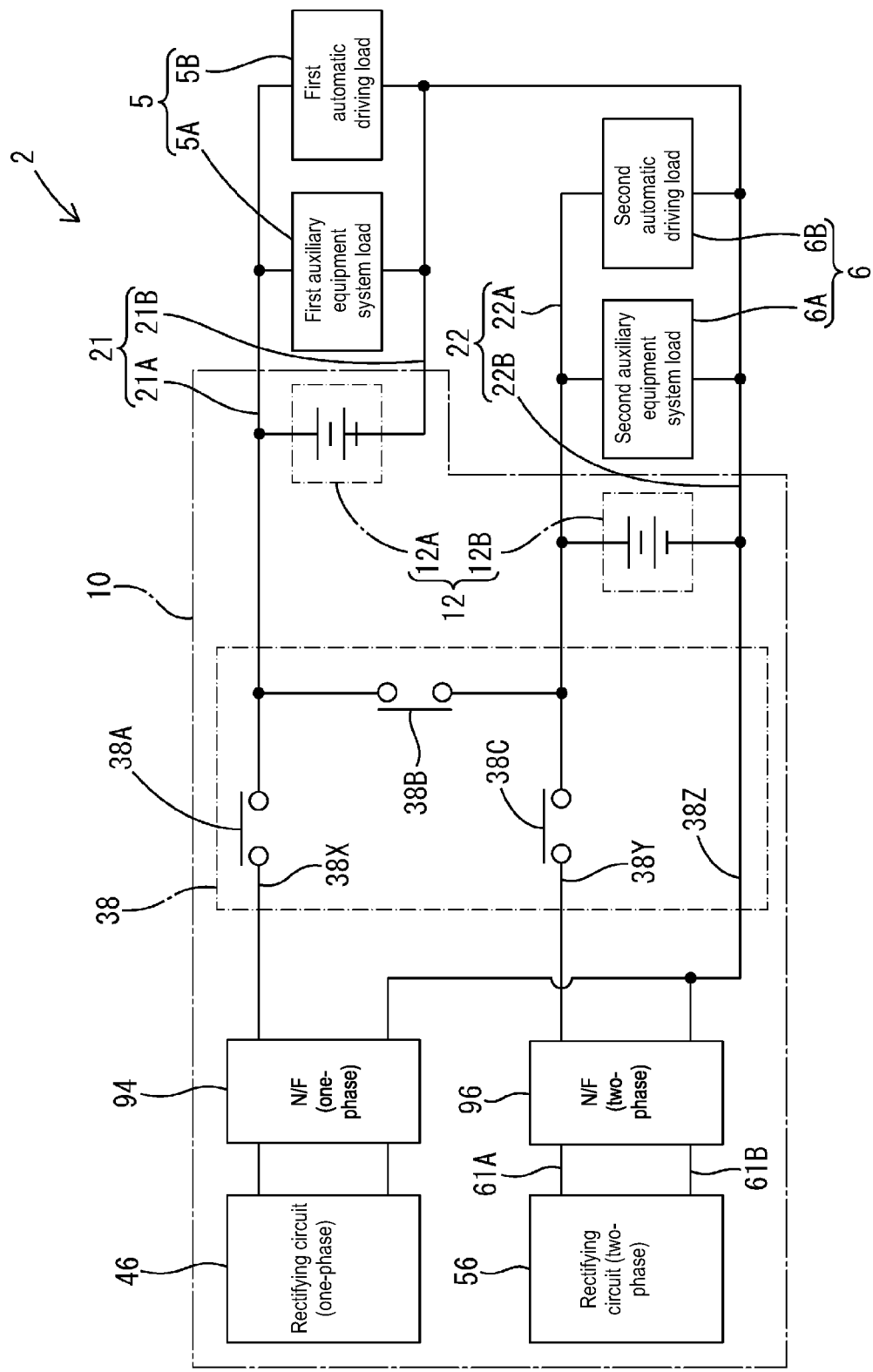
FIG. 4 is an illustrative view conceptually showing a portion of the in-vehicle system of FIG. 1 in an enlarged manner.

As shown in FIG. 4, the selection circuit 38 is a circuit to which power is supplied from a plurality of output circuits 46 and 56. The selection circuit 38 selects the power supply destination from the first conductive path 21 and the second conductive path 22. The selection circuit 38 includes the conductive paths 38X, 38Y, and 38Z, which are input paths. The selection circuit 38 includes relays 38A, 38B, and 38C.

The relay 38A is interposed between the conductive path 38X and the conductive path 21A, and switches the conductive path 38X and the conductive path 21A to an electrically connected state and a cut-off state. When the relay 38A is on, current can flow between the conductive path 38X and the conductive path 21A. When the relay 38A is off, no current flows between the conductive path 38X and the conductive path 21A.

The relay 38C is interposed between the conductive path 38Y and the conductive path 22A, and switches the conductive path 38Y and the conductive path 22A to an electrically connected state and a cut-off state. When the relay 38C is on, current can flow between the conductive path 38Y and the conductive path 22A. When the relay 38C is off, no current flows between the conductive path 38Y and the conductive path 22A.

The relay 38B is interposed between the conductive path 21A and the conductive path 22A, and switches the conductive path 21A and the conductive path 22A to an electrically connected state and a cut-off state. When the relay 38B is on, current can flow between the conductive path 21A and the conductive path 22A. When the relay 38B is off, no current flows between the conductive path 21A and the conductive path 22A. When the relay 38A is on and the relay 38B is on, current can flow from the conductive path 38X to the conductive path 22A. When the relay 38C is on and the relay 38B is on, current can flow from the conductive path 38Y to the conductive path 21A.

The relays 38A, 38B, and 38C correspond to an example of the first relay arranged between each of the output circuits 46 and 56 and the first conductive path 21. The selection circuit 38 switches the circuit for supplying power to the first conductive path 21 by switching the on/off state of the relays 38A, 38B, and 38C (plurality of first relays). Specifically, the selection circuit 38 sets the output circuit 46 as the "circuit for supplying power to the first conductive path 21" when the relay 38A is on, and sets the output circuit 46 as the "circuit that does not supply power to the first conductive path 21" when the relay 38A is off. Also, the selection circuit 38 sets the output circuit 56 as the "circuit for supplying power to the first conductive path 21" when the relays 38B and 38C are on, and sets the output circuit 56 as the "circuit that does not supply power to the first conductive path 21" when any of the relays 38B and 38C is off. The relays 38A, 38B, and 38C correspond to examples of the second relays respectively arranged between each of the output circuits 46 and 56 and the second conductive path 22. The selection circuit 38 switches the circuit for supplying power to the second conductive path 22 by switching the on/off state of the relays 38A, 38B, and 38C (plurality of second relays). Specifically, the selection circuit 38 sets the output circuit 56 as the "circuit for supplying power to the second conductive path 22" when the relay 38C is on, and sets the output circuit 56 as the "circuit that does not supply power to the second conductive path 22" when the relay 38C is off. Also, the selection circuit 38 sets the output circuit 46 as the "circuit for supplying power to the second conductive path 22" when the relays 38A and 38B are on, and sets the output circuit 46 as the "circuit that does not supply power to the second conductive path 22" when either of the relays 38A and 38B is off.

The control unit 18 shown in FIG. 1 corresponds to an example of a first abnormality detection unit that detects an abnormality on the first conductive path 21 side. Furthermore, the control unit 18 corresponds to an example of a second abnormality detection unit that detects an abnormality on the second conductive path 22 side. The control unit 18 may also adopt a determination method of determining that the first conductive path 21 side is abnormal when the current flowing through the first conductive path 21 is in an overcurrent state of being a first threshold value or more when the vehicle is traveling. Alternatively, the control unit 18 may also employ a determination method of determining that the first conductive path 21 side is abnormal when the current flowing through the first conductive path 21 is in a low current state of being less than a second threshold value when the vehicle is traveling. Alternatively, the control unit 18 may also adopt a determination method of determining that the first conductive path 21 side is abnormal when the voltage of the first conductive path 21 is in a low voltage state of being lower than a threshold voltage when the vehicle is traveling. In this case, the threshold voltage is a value that is larger than 0 V and is lower than the output voltage when the first low-voltage battery 12A is fully charged, and is a value that is lower than the output voltage when the second low-voltage battery 12B is fully charged.

The control unit 18 may also adopt a determination method of determining that the second conductive path 22 side is abnormal when the current flowing through the second conductive path 22 is in an overcurrent state of being a second threshold value or more when the vehicle is traveling. Alternatively, the control unit 18 may also employ a determination method of determining that the second conductive path 22 side is abnormal when the current flowing through the second conductive path 22 is in a low voltage state of being less than the second threshold value when the vehicle is traveling. The control unit 18 may also adopt a determination method of determining that the second conductive path 22 side is abnormal when the voltage of the second conductive path 22 is in a low voltage state of being lower than the threshold voltage when the vehicle is traveling. In this case, the threshold voltage is a value that is larger than 0 V and lower than the output voltage when the second low-voltage battery 12B is fully charged, and is a value that is lower than the output voltage when the second low-voltage battery 12B is fully charged.

The control unit 18 shown in FIG. 1 functions as an abnormal circuit detection unit and an output abnormality detection unit, and can detect an abnormality in each of the plurality of power supply circuits 34 and 36 (e.g., an output abnormality in each of the plurality of output circuits 46 and 56, etc.). The control unit 18 may also adopt a determination method of determining that the power supply circuit 34 is abnormal during an overcurrent state in which current that is a threshold current or more is generated at a predetermined portion of the power supply circuit 34. Alternatively, the control unit 18 may also adopt a determination method of determining that the power supply circuit 34 is abnormal during an overvoltage state in which the predetermined portion of the power supply circuit 34 is at a voltage that is a first threshold voltage or more. Alternatively, the control unit 18 may also adopt a determination method of determining that the power supply circuit 34 is abnormal during a low voltage state in which the predetermined portion of the power supply circuit 34 is at a voltage that is the second threshold voltage or less. Alternatively, the control unit 18 can also adopt a determination method of determining that the power supply circuit 34 is abnormal (e.g., determining an output abnormality of the output circuit 46) if any of the power, voltage, and current output from the output circuit 46 is a predetermined value or less while the relay 38A is on and the power supply circuit 34 is operating. Similarly, the control unit 18 may also adopt a determination method of determining that the power supply circuit 36 is abnormal during an overcurrent state in which current that is a threshold current or more is generated at a predetermined portion of the power supply circuit 36. Alternatively, the control unit 18 may also adopt a determination method of determining that the power supply circuit 36 is abnormal during an overvoltage state in which the predetermined portion of the power supply circuit 36 is at a voltage that is the first threshold voltage or more. Alternatively, the control unit 18 may also adopt a determination method of determining that the power supply circuit 36 is abnormal during a low voltage state in which the predetermined portion of the power supply circuit 36 is at a voltage that is the second threshold voltage or less. Alternatively, the control unit 18 can also adopt a determination method of determining that the power supply circuit 36 is abnormal (e.g., determining an output abnormality of the output circuit 56) if any of the power, voltage, and current output from the output circuit 56 is a predetermined value or less while the relay 38C is on and the power supply circuit 36 is operating.

Operation During External Charging

The following description relates to the operation of the power source system 10 at the time of external charging. During external charging, the power source system 10 can be electrically connected to the external AC power source 190, which is a power source outside the vehicle, via a cable or the like (not shown). When the external AC power source 190 is connected to the vehicle 1 (FIG. 2) and the external AC power source 190 and the power source system 10 are electrically connected to each other, power is supplied from the first low-voltage battery 12A and the second low-voltage battery 12B to the control unit 18. A control device (not shown) that is different from the control unit 18 detects that the external AC power source 190 is electrically connected to the power source system 10 and controls the power supply to the control unit 18.

When power starts to be supplied from the first low-voltage battery 12A and the second low-voltage battery 12B to the control unit 18 according to the connection of the external AC power source 190, the control unit 18 operates the power supply unit 30. Specifically, the control unit 18 operates the PFC converter 32 and the power supply circuits 34 and 36 so that the AC voltage from the external AC power source 190 is converted into a high-voltage DC voltage and the resulting DC voltage is supplied to the high-voltage battery 11. When the power supply unit 30 operates in this manner, the high-voltage battery 11 is charged. Note that if the voltage ratio between the first end portion 48M and the second end portion 48N is appropriately set in the transformer 48 and the voltage ratio between the first end portion 58M and the second end portion 58N is appropriately set in the transformer 58, the power supply unit 30 supplies an appropriate charging voltage to the high-voltage battery 11.

On the other hand, the control unit 18 turns on all the relays 38A, 38B, and 38C when operating the power supply unit 30 as described above at the time of external charging. Then, the AC voltage from the external AC power source 190 is converted into a low-voltage DC voltage and the resulting DC voltage is output from the output circuits 46 and 56, respectively, and the DC voltage output from the output circuits 46 and 56 is supplied to the first low-voltage battery 12A and the second low-voltage battery 12B. Accordingly, the first low-voltage battery 12A and the second low-voltage battery 12B are charged. If the voltage ratio of the first coil 48A and the second coil 48C is suitably set in the transformer 48 and the voltage ratio of the first coil 58A and the second coil 58C is suitably set in the transformer 58, a suitable charging voltage is supplied to the first low-voltage battery 12A and the second low-voltage battery 12B.

Operation in Normal State when Vehicle is Traveling

The following description is a description relating to the operation when the power source system 10 is in a normal state while the vehicle is traveling. The normal state when the vehicle is traveling in this context is a state in which the first abnormality detection unit and the second abnormality detection unit have not detected any abnormality in the first conductive path 21 or the second conductive path 22 when the vehicle is traveling, and the abnormal circuit detection unit has not detected any abnormality in the power supply circuits 34 and 36. In the vehicle 1 shown in FIG. 2, when an ignition key, a wireless key, or the like is operated and the vehicle 1 is started in response to the key operation, power starts to be supplied from the first low-voltage battery 12A and the second low-voltage battery 12B to the control unit 18. A control device (not shown) that is different from the control unit 18 performs detection of the operation of the ignition key, the wireless key, or the like, the starting of supply of power to the control unit 18, and the like.

When the vehicle is running, the control unit 18 operates the above-described PCU (not shown). At this time, the high-voltage DC power supplied from the high-voltage battery 11 is supplied to the above-described PCU and converted into AC power by the PCU, and the resulting AC power is supplied to the drive unit 8 (FIG. 2). Due to the AC power being supplied from the PCU to the drive unit 8 in this manner, the drive unit 8 starts operation. Then, the operation of the drive unit 8 is controlled by the control unit 18 controlling the PCU.

On the other hand, when power starts to be supplied from the first low-voltage battery 12A and the second low-voltage battery 12B to the control unit 18 in response to the above-described key operation, the control unit 18 turns on all the relays 38A, 38B, and 38C of the selection circuit 38. Furthermore, when the vehicle is traveling, due to the power supply unit 30 operating, the high-voltage DC power supplied from the high-voltage battery 11 to the converter circuit 44 is converted into a low-voltage DC power by the converter circuit 44, the transformer 48, and the output circuit 46, and the resulting DC power is output from the output circuit 46. Specifically, the converter circuit 44 converts the DC voltage applied to the terminals 44M and 44N into an AC voltage, and performs the above-described second operation such that the AC voltage is applied between both ends of the second coil 48B (between both ends of the second end portion 48N). In this manner, in response to the AC voltage being applied between both ends of the second coil 48B, the AC voltage is supplied between the end portions of the second coil 48C. Then, when the AC voltage is supplied to the second coil 48C, the output circuit 46 rectifies and smooths the AC voltage input from the second coil 48C, and applies a DC voltage between the terminals 46M and 46N. Similarly, the high-voltage DC power supplied from the high-voltage battery 11 to the converter circuit 54 is converted into low-voltage DC power by the converter circuit 54, the transformer 58, and the output circuit 56, and is output from the output circuit 56. Then, the output circuit applies a DC voltage between the conductive paths 61A and 61B.

When operation conditions are satisfied when the vehicle is traveling in a normal state, the control unit 18 always operates both converter circuits 44 and 54 to output DC power from both output circuits 46 and 56, and when stopping conditions are satisfied, the control unit 18 may stop both outputs of power from both output circuits 46 and 56. Alternatively, when the vehicle is traveling in a normal state, the control unit 18 may operate only one of the converter circuits 44 and 54 when a first operating condition is satisfied, and may operate both converter circuits 44 and 54 when a second operating condition is satisfied. In this case as well, the control unit 18 may stop all of the outputs of power from the plurality of output circuits 46 and 56 when the stopping condition is satisfied.

Operation at Time of Abnormality when Vehicle is Traveling

As described above, when the vehicle is traveling in a normal state, the control unit 18 operates the power supply unit 30, and a DC voltage can be output from the output circuits 46 and 56 to the first conduction path 21 and the second conduction path 22 based on the power from the high-voltage battery 11. On the other hand, when the vehicle is traveling, the control unit 18 monitors abnormalities on the first conductive path 21 side and the second conductive path 22 side using any of the above-described determination methods. Furthermore, when the vehicle is traveling, the control unit 18 monitors abnormalities of the power supply circuits 34 and 36 using any of the above-described determination methods.

If it is determined that the first conductive path 21 side is abnormal using any of the above-mentioned determination methods when the vehicle is traveling, the control unit 18 turns off the relays 38A and 38B and turns on the relay 38C. By this operation, the flow of current between the output circuits 46 and 56 and the first conductive path 21 is cut off, and the flow of current between the second conductive path 22 and the first conductive path 21 is also cut off. Accordingly, the first conductive path 21 can be electrically disconnected, and the power from the output circuit 56 can be selectively supplied to the second conductive path 22.

If it is determined that the second conductive path 22 side is abnormal using any of the above-described determination methods when the vehicle is traveling, the control unit 18 turns off the relays 38B and 38C and turns on the relay 38A. By this operation, the flow of current between the output circuits 46 and 56 and the second conductive path 22 is cut off, and the flow of current between the first conductive path 21 and the second conductive path 22 is also cut off. Accordingly, the second conductive path 22 can be electrically disconnected, and the power from the output circuit 46 can be selectively supplied to the first conductive path 21.

If it is determined that the power supply circuit 34 is abnormal using any of the above-described determination methods when the vehicle is traveling, the control unit 18 turns off the relays 38A and 38B and turns on the relay 38C. By this operation, the flow of current between the output circuit 46 and the first conductive path 21 and second conductive path 22 is cut off, and the flow of current between the second conductive path 22 and the first conductive path 21 is also cut off. Accordingly, the power from the output circuit 56 can be selectively supplied to the second conductive path 22.

If it is determined that the power supply circuit 34 is abnormal, the control unit 18 may turn off the relay 38A and turn on the relays 38B and 38C at all times or under predetermined conditions. By this operation, the power from the output circuit 56 can be supplied to either the first conductive path 21 or the second conductive path 22 while the flow of current between the output circuit 46 and the first conductive path 21 and second conductive path 22 is cut off.

If it is determined that the power supply circuit 34 is abnormal, the control unit 18 may also perform control for turning off the relay 38A and turning on the relays 38B and 38C when a first supply condition is satisfied. Also, if it is determined that the power supply circuit 34 is abnormal, the control unit 18 may perform control for turning off the relays 38A and 38B and turning on the relay 38C when a second supply condition is satisfied.

If it is determined that the power supply circuit 36 is abnormal using any of the above-mentioned determination methods when the vehicle is traveling, the control unit 18 turns off the relays 38B and 38C and turns on the relay 38A. By this operation, the flow of current between the output circuit 56 and the first conductive path 21 and second conductive path 22 is cut off, and the flow of current between the first conductive path 21 and the second conductive path 22 is also cut off. Accordingly, the power from the output circuit 46 can be selectively supplied to the first conductive path 21.

If it is determined that the power supply circuit 36 is abnormal, the control unit 18 may turn off the relay 38C and turn on the relays 38A and 38B at all times or under predetermined conditions. By this operation, the power from the output circuit 46 can be supplied to either the first conductive path 21 or the second conductive path 22 while the flow of current between the output circuit 56 and the first conductive path 21 and second conductive path 22 is cut off.

If it is determined that the power supply circuit 36 is abnormal, the control unit 18 may perform control for turning off the relays 38B and 38C and turning on the relay 38A when a third supply condition is satisfied. Then, if it is determined that the power supply circuit 36 is abnormal, the control unit 18 may perform control for turning off the relay 38C and turning on the relays 38A and 38B when a fourth supply condition is satisfied.

In this example, the control unit 18 corresponds to an example of the selection control unit, and controls the selection operation of the selection circuit 38. If a first condition is satisfied, the control unit 18 controls the selection circuit 38 in a state where the power supply to the second conductive path 22 is cut off and power supply to the first conductive path 21 is allowed. Then, if a second condition is satisfied, the control unit 18 controls the selection circuit 38 in a state where the power supply to the first conductive path 21 is cut off and the power supply to the second conductive path 22 is allowed. Specifically, if the second abnormality detection unit detects an abnormality on the second conductive path 22 side, the control unit 18 (selection control unit) controls the selection circuit 38 in a state where the power supply to the second conduction path 22 is cut off, and a state where the power supply to the first conductive path 21 is allowed. Then, if the first abnormality detection unit detects an abnormality on the first conductive path 21 side, the control unit 18 controls the selection circuit 38 in a state where the power supply to the first conductive path 21 is cut off and a state where power supply to the second conductive path 22 is cut off.

Furthermore, if it is determined that one of the power supply circuits 34 and 36 is abnormal using any of the above-described determination methods, the control unit 18 controls the selection circuit 38 so as to cut off the flow of current between the power supply circuit determined as being abnormal and the first conductive path 21 and second conductive path 22. Then, the control unit 18 controls the selection circuit 38 so as to allow a flow of current between the power supply circuit that has not been determined as being abnormal and at least one of the first conductive path 21 and the second conductive path 22. For example, if it is determined that an output abnormality has occurred in any of the output circuits 46 and 56, the control unit 18 controls the selection circuit 38 so as to cut off the flow of current between the output circuit in which the output abnormality has occurred and the first conductive path 21 and second conductive path 22. Then, the control unit 18 controls the selection circuit 38 so as to allow a flow of current between the output circuit in which no output abnormality has occurred and at least one of the first conductive path 21 and the second conductive path 22.

Furthermore, the control unit 18 functions as an example of the stopping control unit. If it is determined that any of the plurality of power supply circuits 34 and 36 is abnormal using any of the above-described determination methods (i.e., if any of the plurality of power supply circuits 34 and 36 is in an abnormal state), the control unit 18 stops the operation of the power supply circuit in the abnormal state. For example, if it has been determined that an output abnormality has occurred in any of the plurality of output circuits 46 and 56, the control unit 18 stops the operation of the power supply circuit including the output circuit in which the output abnormality has occurred.

Note that it is also possible to use a configuration in which a fuse or relay is provided between the terminals 46M and 46N of the output circuit 46 and the selection circuit 38 and protection is achieved by cutting off the fuse or relay when an overcurrent occurs between the output circuit 46 and the selection circuit 38. Similarly, it is also possible to use a configuration in which a fuse or relay is provided between the output circuit 56 and the selection circuit 38 and protection is achieved by cutting off the fuse or relay when an overcurrent occurs between the output circuit 56 and the selection circuit 38.

The following description relates to an illustration of the effects of the present disclosure.

In the power source system 10 described above, the selection circuit 38 can select the supply destination of the power output from the plurality of output circuits (rectifier circuits) 46 and 56 from the first conduction path 21 and the second conduction path 22. That is, the power source system 10 can switch between an operation of individually maintaining the power supply to the first load 5 and an operation of individually maintaining the power supply to the second load 6. Accordingly, the power source system 10 can increase the redundancy of the power supply to the load. Moreover, since some components used for charging the high-voltage battery 11 (power storage unit) and some components used for supplying power to the first load 5 and the second load 6 are used in common in the power source system 10, it is possible to realize a more compact configuration that can increase redundancy.

In the power source system 10, each of the plurality of output circuits 46 and 56 is constituted by a rectifier circuit, and therefore it is possible to realize an even more compact configuration that can perform charging of the high-voltage battery 11 (power storage unit) and power supply to the first load 5 and the second load 6 while using some components in common.

If a first condition is satisfied, the power source system 10 can perform an operation of selectively supply power to only the first conductive path 21 of the first conductive path 21 and the second conductive path 22. Also, if the second condition is satisfied, the power source system 10 can perform an operation of selectively supplying power to only the second conductive path 22 of the first conductive path 21 and the second conductive path 22. That is, the power source system 10 can perform control so as to switch the output destination of the power from the selection circuit 38 according to conditions.

The power source system 10 can perform an operation of selectively supplying power to only the first conductive path 21 of the first conductive path 21 and the second conductive path 22 in the event of an abnormality on the second conductive path 22 side. Accordingly, in the event of an abnormality on the second conductive path 22 side, this power source system 10 can maintain the power supply to the first load 5 while suppressing the influence of the abnormality on the first conductive path 21 side. Also, the power source system 10 can perform an operation of selectively supplying power to only the second conductive path 22 of the first conductive path 21 and the second conductive path 22 in the event of an abnormality on the first conductive path 21 side. Accordingly, in the event of an abnormality on the first conductive path 21 side, this power source system 10 can maintain the power supply to the second load 6 while suppressing the influence of the abnormality on the second conductive path 22 side.

If an abnormality occurs in any of the inverter circuits, transformers, output circuits, and the like, the power source system 10 can use the inverter circuits, transformers, and output circuits of the path in which no abnormality has occurred to maintain the power supply to the first conductive path side or the second conductive path side. Accordingly, the power source system 10 can further increase the redundancy of the power supply to the first conductive path or the second conductive path.

If an abnormality occurs in any of the inverter circuits, transformers, converter circuits, and the like of the plurality of power supply circuits 34 and 36, the power source system 10 can use the circuit of the path in which no abnormality has occurred to maintain power supply to the high-voltage battery 11 side. Accordingly, the power source system 10 can further improve the redundancy of the power supply to the high-voltage battery 11 side.

If any of the power supply circuits 34 and 36 becomes abnormal, the power source system 10 can achieve protection by stopping that power supply circuit. Moreover, even if one of the power supply circuits is stopped, the power source system 10 can operate the other power supply circuit to charge the high-voltage battery 11 and supply power to the first load 5 or the second load 6.

If an output abnormality occurs in any of the plurality of output circuits 46 and 56, the power source system 10 can achieve protection by electrically disconnecting the output circuit in which the output abnormality has occurred from the first conductive path 21 and the second conductive path 22. On the other hand, the power source system 10 can allow the flow of current between the output circuit in which no output abnormality has occurred and at least one of the first conductive path 21 and the second conductive path 22, and can maintain power supply to at least one of the conductive paths.

In the power source system 10, the configuration for switching between the operation of individually maintaining the power supply to the first load 5 and the operation of individually maintaining the power supply to the second load 6 is easily realized by using the first relay and the second relay as main parts.

Second Embodiment

Figure 5:
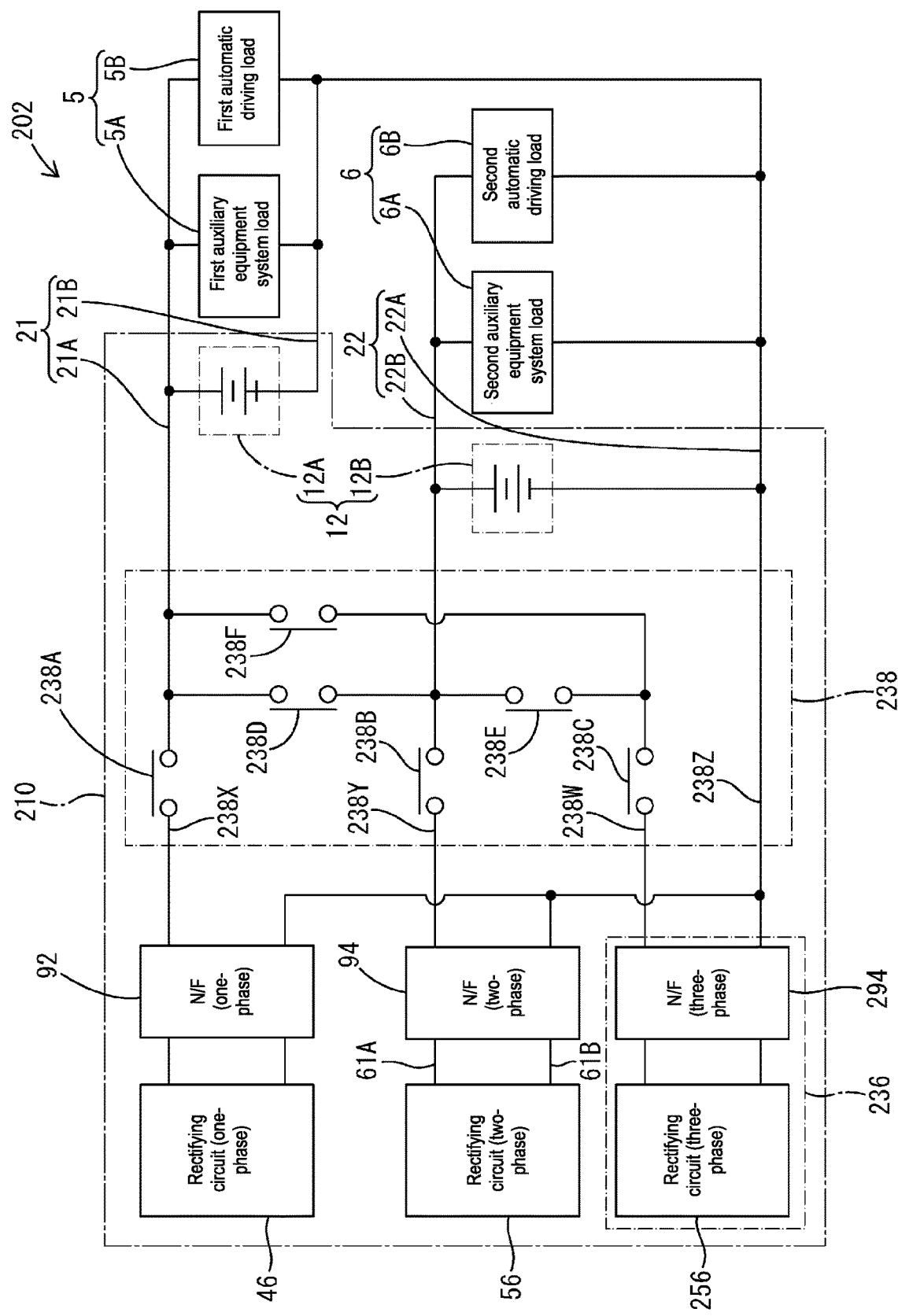
FIG. 5 is an illustrative view conceptually showing, in an enlarged manner, a portion of an in-vehicle system in which a power source system according to a second embodiment of the present disclosure is mounted.

The following description relates to a power source system 210 of a second embodiment. In the power source system 210, a power supply circuit 236 that is the same as the power supply circuit 36 has been added, and the selection circuit 38 has been changed to a selection circuit 238, which are structural differences when compared with the power source system 10. The power source system 210 is the same as the power source system 10 in FIG. 1 in other respects. The in-vehicle system 202 of FIG. 5 is a system in which the power source system 10 has been changed to the power source system 210 in an in-vehicle system 2.

The power supply circuit 236 has the same configuration as the power supply circuit 36 and functions in the same manner as the power supply circuit 36. In the power supply circuit 236, an inverter circuit that is the same as the inverter circuit 52 has a pair of input terminals that are electrically connected to both ends of the capacitor 32H in FIG. 3. In the power supply circuit 236, a converter circuit that is the same as the converter circuit 54 has a pair of output terminals that are electrically connected to the conductive paths 14A and 14B. In the power supply circuit 236, an output circuit 256 has the same configuration as the output circuit 56, and has a pair of output terminals that are electrically connected to a conductive path 238W and a conductive path 238Z of the selection circuit 238. Note that it is also possible to use a configuration in which a fuse or relay is provided between the output circuit 256 and the selection circuit 238, and protection is achieved such that the fuse or relay is cut off when an overcurrent occurs between the output circuit 256 and the selection circuit 238.

The selection circuit 238 is a circuit to which power is supplied from a plurality of output circuits 46, 56, and 256, and that selects the power supply destination from the first conductive path 21 and the second conductive path 22. The selection circuit 238 includes relays 238A, 238B, 238C, 238D, 238E, and 238F. The selection circuit 238 includes conductive paths 238W, 238X, 238Y, and 238Z, which are input paths.

During external charging, the power source system 210 also operates the power supply circuit 236 in a manner similar to the power supply circuit 36 when the power supply circuit 36 operates. Then, during external charging, the power source system 210 turns on all the relays 238A, 238B, 238C, 238D, 238E, and 238F of the selection circuit 238. Other than these points, the "operation during external charging" of the power source system 210 is the same as that of the power source system 10 of the first embodiment.

When the vehicle is traveling in a normal state, the power source system 210 also operates the power supply circuit 236 in the same manner as the power supply circuit 36 when the power supply circuit 36 operates. Then, the power source system 210 turns on all the relays 238A, 238B, 238C, 238D, 238E, and 238F of the selection circuit 238 in the normal state when the vehicle is traveling. Except for these points, the "operation in the normal state when the vehicle is traveling" of the power source system 210 is the same as that of the power source system 10 of the first embodiment. Note that the power source system 210 does not need to turn on the relay 238F in the normal state.

In the power source system 210, when the vehicle is traveling, the control unit 18 monitors the abnormalities on the first conductive path 21 side and the second conductive path 22 side using any of the above-described determination methods. Furthermore, when the vehicle is traveling, the control unit 18 monitors the abnormalities of the power supply circuits 34, 36, and 236 using any of the above-described determination methods. The abnormality determination method of the power supply circuit 236 is the same as the abnormality determination method of the power supply circuits 34 and 36.

If it is determined that the first conductive path 21 side is abnormal using any of the above-mentioned determination methods when the vehicle is traveling, the control unit 18 turns off the relays 238A, 238D, and 238F and turns on the relays 238B, 238C, and 238E. By this operation, the flow of current between the output circuits 46, 56, and 256 and the first conductive path 21 is cut off, and the flow of current between the second conductive path 22 and the first conductive path 21 is also cut off. Accordingly, the first conductive path 21 can be electrically disconnected, and the power from the output circuits 56 and 256 can be selectively supplied to the second conductive path 22. In this case, the control unit 18 may turn on the relay 238B and turn off the relays 238C and 238E without turning on all the relays 238B, 238C and 238E, or may turn off the relay 238B and turn on the relays 238C and 238E.

If it is determined that the second conductive path 22 side is abnormal using any of the above-mentioned determination methods when the vehicle is traveling, the control unit 18 turns off the relays 238D, 238B, and 238E and turns on the relays 238A, 238C, and 238F. By this operation, the flow of current between the output circuits 46, 56, and 256 and the second conductive path 22 is cut off, and the flow of current between the second conductive path 22 and the first conductive path 21 is also cut off. Accordingly, the second conductive path 22 can be electrically disconnected, and the power from the output circuits 46 and 256 can be selectively supplied to the first conductive path 21. In this case, the control unit 18 may turn on the relay 238A and turn off the relays 238C and 238F without turning on all the relays 238A, 238C, and 238F, or may turn off the relay 238A and turn on the relays 238C and 238F.

If it is determined that the power supply circuit 34 is abnormal using any of the above-mentioned determination methods while the vehicle is traveling (e.g., if it is determined that an output abnormality has occurred in the output circuit 46), the control unit 18 turns off the relay 238A. In this case, the control unit 18 turns on the other relays 238B, 238C, 238D, 238E, and 238F. By this operation, the flow of current between the output circuit 46 and the first conductive path 21 and second conductive path 22 is cut off. Note that in this case, the control unit 18 does not need to turn on all the relays 238B, 238C, 238D, 238E, and 238F.

If it is determined that the power supply circuit 36 is abnormal using any of the above-mentioned determination methods while the vehicle is traveling (e.g., if it is determined that an output abnormality has occurred in the output circuit 56), the control unit 18 turns off the relay 238B. In this case, the control unit 18 turns on the other relays 238A, 238C, 238D, 238E, and 238F. By this operation, the flow of current between the output circuit 56 and the first conductive path 21 and second conductive path 22 is cut off. Note that in this case, the control unit 18 does not need to turn on all the relays 238A, 238C, 238D, 238E, and 238F.

If it is determined that that the power supply circuit 236 is abnormal using any of the above-described determination methods while the vehicle is traveling (e.g., if it is determined that an output abnormality has occurred in the output circuit 256), the control unit 18 turns off the relay 238C. In this case, the control unit 18 turns on the other relays 238A, 238B, 238D, 238E, and 238F. By this operation, the flow of current between the output circuit 56 and the first conductive path 21 and second conductive path 22 is cut off. Note that in this case, the control unit 18 does not need to turn on all the relays 238A, 238B, 238D, 238E, and 238F.

Other Embodiments

The present disclosure is not limited to the embodiments described above with reference to the description and drawings. For example, the features of the embodiments described above or below can be combined in any combination as long as there is no inconsistency. Also, any of the features of the embodiments described above or below can be omitted unless it is clearly stated as being essential. Furthermore, the above-described embodiment may be modified as follows.

Figure 6:
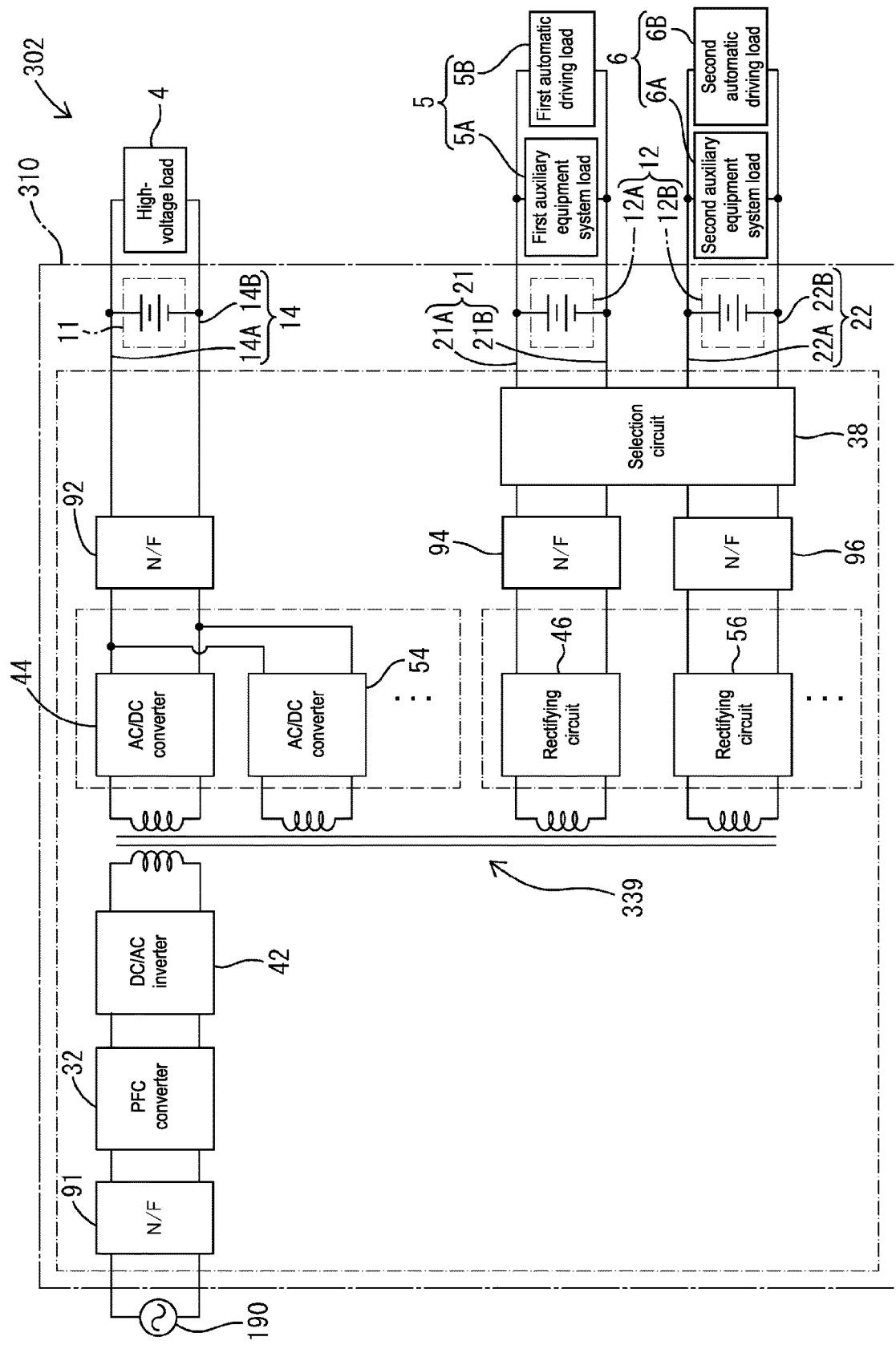
FIG. 6 is a block diagram schematically illustrating an in-vehicle system including a power source system according to another embodiment of the present disclosure.

In the above-described embodiment, the transformer unit 39 was constituted by a plurality of transformers 48 and 58 and the like, but a transformer unit 339 may be constituted by a single transformer as in a power source system 310 of FIG. 6. The in-vehicle system 302 in FIG. 6 is a system in which the power source system 10 has been changed to a power source system 310 in the in-vehicle system 2. In the configuration of FIG. 6, the plurality of inverter circuits 42 and 52 in FIG. 1 are used in common by the inverter circuit 42, and the converter circuits 44 and 54 and the output circuits 46 and 56 are electrically connected to each second coil of the transformer (transformer unit 339) that is used in common. Even with the configuration shown in FIG. 6, the same operation as that of the first embodiment can be performed, and the same effect as that of the first embodiment can be obtained.

In the above-described embodiment, the output circuits 46, 56, and 256 configured as predetermined rectifying circuits were illustrated, but the output circuit may be a circuit of another configuration, as long as it is a circuit capable of converting the input AC power into DC power and outputting the resulting DC power.

In the above-described embodiment, the power source system 10 included the high-voltage battery 11 (power storage unit), but the power source system 10 need not include the high-voltage battery 11. That is, the power source system 10 may be a device different from the high-voltage battery 11.

In the above-described embodiment, the power source system 10 included a first low-voltage battery 12A and a second low-voltage battery 12B (a low-voltage battery having an output voltage lower than that of the power storage unit). However, the power source system 10 need not include one or both of the first low-voltage battery 12A and the second low-voltage battery 12B. That is, the power source system 10 may also be a device different from one or both of the first low-voltage battery 12A and the second low-voltage battery 12B.

In the above-described embodiment, the control unit 18 corresponded to an example of the selection control unit, but the selection control unit may be configured as a device different from the control unit 18.

In the above-described embodiment, the control unit 18 functioned as the first abnormality detection unit and the second abnormality detection unit, but one or both of the first abnormality detection unit and the second abnormality detection unit may be constituted by a device that is different from the control unit 18.

In the description of the above embodiment, an example of determining that the first conductive path 21 side is abnormal and an example of determining that the second conductive path 22 side is abnormal were described, but the present disclosure is not limited to this example. For example, the first abnormality detection unit may determine that the first conductive path 21 side is abnormal if an abnormality signal is acquired from the first load 5, a control device that controls the first load 5, or the like. Similarly, the second abnormality detection unit may determine that the second conduction path 22 side is abnormal if an abnormality signal is acquired from the second load 6, a control device that controls the second load 6, or the like. Alternatively, the first abnormality detection unit may determine that the first conductive path 21 side is abnormal when the SOH (States Of Health) of the first low-voltage battery 12A is in a deteriorated state of being a predetermined value or less. Similarly, the second abnormality detection unit may determine that the second conductive path 22 side is abnormal when the SOH (States Of Health) of the second low-voltage battery 12B is in a deteriorated state of being a predetermined value or less.

In the above-described embodiment, the case where the power source systems 10, 210, and 310 are mounted in a vehicle such as a PHEV or an EV was described, but the present disclosure is not limited to this. The power source systems 10, 210, and 310 may be mounted in a vehicle of a type other than these (e.g., a HEV (Hybrid Electric Vehicle)), or may be mounted in a device other than a vehicle.

Note that the embodiments disclosed herein are to be considered exemplary in all respects and not restrictive. The scope of the present disclosure is not limited to the embodiments disclosed here, but is intended to include all modifications within the scope indicated by the claims or within the scope equivalent to the claims.

The invention claimed is:

1. A power source system to be used in an in-vehicle system, the in-vehicle system including a first load, a second load and a power storage unit, the power source system comprising:
   a first conductive path for supplying power to the first load;
   a second conductive path for supplying power to the second load, the second conductive path different than the first conductive path;
   an inverter unit including one or more inverter circuits that convert DC power obtained based on power supplied from a power source that is different from the power storage unit into AC power, and supply the AC power;
   a transformer unit including one or more first coils to which AC power is supplied from the inverter unit and a plurality of second coils;
   a converter circuit that is electrically connected to a second coil on a first side of the plurality of second coils, and is configured to convert AC power of the second coil on the first side into DC power and supply the DC power to the power storage unit side;
   a plurality of output circuits that are electrically connected to a plurality of second coils on a second side that are different from the second coil on the first side among the plurality of second coils; and
   a selection circuit to which power is supplied from the plurality of output circuits,
   wherein each of the plurality of output circuits is electrically connected to each of the plurality of second coils on the second side and outputs DC power based on the AC power of the second coil on the second side, and
   the selection circuit selects a supply destination of the power from the first conductive path and the second conductive path so as to selectively supply power to the first load and the second load.

2. The power source system according to claim 1, wherein each of the plurality of output circuits is a rectifying circuit that rectifies the AC power supplied from the second coil on the second side.

3. The power source system according to claim 1, further comprising:
   a selection control unit configured to control a selection operation of the selection circuit,
   wherein if a first condition is satisfied, the selection control unit controls the selection circuit in a state where power supply to the second conductive path is cut off and a state where power supply to the first conductive path is allowed, and if a second condition is satisfied, the selection control unit controls the selection circuit in a state where power supply to the first conductive path is cut off and a state where power supply to the second conductive path is allowed.

4. The power source system according to claim 3, further comprising:
   a first abnormality detection unit configured to detect an abnormality on the first conductive path side; and
   a second abnormality detection unit configured to detect an abnormality on the second conductive path side,
   wherein if the second abnormality detection unit detects an abnormality on the second conductive path side, the selection control unit controls the selection circuit in a state where power supply to the second conductive path is cut off and a state where power supply to the first conductive path is allowed, and if the first abnormality detection unit detects an abnormality on the first conductive path side, the selection control unit controls the selection circuit in a state where power supply to the first conductive path is cut off and a state where power supply to the second conductive path is allowed.

5. The power source system according to claim 1,
wherein the inverter unit includes a plurality of the inverter circuits,
the transformer unit includes a plurality of transformers including the first coil and the second coil on the second side,
each of the inverter circuits is electrically connected to the first coil of each of the transformers and supplies AC power to each of the first coils, and
the second coil on the second side of each of the transformers is electrically connected to each of the output circuits and supplies AC power to each of the output circuits.

6. The power source system according to claim 5, further comprising:
a plurality of the converter circuits,
wherein each of the plurality of transformers includes the second coil on the first side, and
each of the second coils on the first side is electrically connected to each of the converter circuits and supplies AC power to each of the converter circuits.

7. The power source system according to claim 6, further comprising:
a plurality of power supply circuits including the inverter circuit, the transformer, the converter circuit, and the output circuit;
an abnormal circuit detection unit configured to detect an abnormality in any one of the plurality of power supply circuits; and
a stopping control unit configured to stop operation of each of the plurality of power supply circuits in which an abnormality is detected.

8. The power source system according to claim 1, further comprising:
a selection control unit configured to control a selection operation of the selection circuit; and
an output abnormality detection unit configured to, if an output abnormality has occurred in any of the plurality of output circuits, detect the output circuit in which the output abnormality has occurred,
wherein the selection control unit controls the selection circuit so as to cut off a flow of current between the output circuit in which the output abnormal has occurred and the first conductive path and second conductive path, and allow a flow of current between the output circuit in which the output abnormality has not occurred and at least one of the first conductive path and the second conductive path.

9. The power source system according to claim 3, further comprising:
a selection control unit configured to control a selection operation of the selection circuit,
wherein if a first condition is satisfied, the selection control unit controls the selection circuit in a state where power supply to the second conductive path is cut off and a state where power supply to the first conductive path is allowed, and if a second condition is satisfied, the selection control unit controls the selection circuit in a state where power supply to the first conductive path is cut off and a state where power supply to the second conductive path is allowed.

10. The power source system according to claim 2,
wherein the inverter unit includes a plurality of the inverter circuits,
the transformer unit includes a plurality of transformers including the first coil and the second coil on the second side,
each of the inverter circuits is electrically connected to the first coil of each of the transformers and supplies AC power to each of the first coils, and
the second coil on the second side of each of the transformers is electrically connected to each of the output circuits and supplies AC power to each of the output circuits.

11. The power source system according to claim 3,
wherein the inverter unit includes a plurality of the inverter circuits,
the transformer unit includes a plurality of transformers including the first coil and the second coil on the second side,
each of the inverter circuits is electrically connected to the first coil of each of the transformers and supplies AC power to each of the first coils, and
the second coil on the second side of each of the transformers is electrically connected to each of the output circuits and supplies AC power to each of the output circuits.

12. The power source system according to claim 4,
wherein the inverter unit includes a plurality of the inverter circuits,
the transformer unit includes a plurality of transformers including the first coil and the second coil on the second side,
each of the inverter circuits is electrically connected to the first coil of each of the transformers and supplies AC power to each of the first coils, and
the second coil on the second side of each of the transformers is electrically connected to each of the output circuits and supplies AC power to each of the output circuits.

13. The power source system according to claim 2, further comprising:
a selection control unit configured to control a selection operation of the selection circuit; and
an output abnormality detection unit configured to, if an output abnormality has occurred in any of the plurality of output circuits, detect the output circuit in which the output abnormality has occurred,
wherein the selection control unit controls the selection circuit so as to cut off a flow of current between the output circuit in which the output abnormal has occurred and the first conductive path and second conductive path, and allow a flow of current between the output circuit in which the output abnormality has not occurred and at least one of the first conductive path and the second conductive path.

14. The power source system according to claim 3, further comprising:
a selection control unit configured to control a selection operation of the selection circuit; and
an output abnormality detection unit configured to, if an output abnormality has occurred in any of the plurality of output circuits, detect the output circuit in which the output abnormality has occurred,
wherein the selection control unit controls the selection circuit so as to cut off a flow of current between the output circuit in which the output abnormal has occurred and the first conductive path and second conductive path, and allow a flow of current between the output circuit in which the output abnormality has not occurred and at least one of the first conductive path and the second conductive path.

15. The power source system according to claim 4, further comprising:
   a selection control unit configured to control a selection operation of the selection circuit; and
   an output abnormality detection unit configured to, if an output abnormality has occurred in any of the plurality of output circuits, detect the output circuit in which the output abnormality has occurred,
   wherein the selection control unit controls the selection circuit so as to cut off a flow of current between the output circuit in which the output abnormal has occurred and the first conductive path and second conductive path, and allow a flow of current between the output circuit in which the output abnormality has not occurred and at least one of the first conductive path and the second conductive path.

16. The power source system according to claim 5, further comprising:
   a selection control unit configured to control a selection operation of the selection circuit; and
   an output abnormality detection unit configured to, if an output abnormality has occurred in any of the plurality of output circuits, detect the output circuit in which the output abnormality has occurred,
   wherein the selection control unit controls the selection circuit so as to cut off a flow of current between the output circuit in which the output abnormal has occurred and the first conductive path and second conductive path, and allow a flow of current between the output circuit in which the output abnormality has not occurred and at least one of the first conductive path and the second conductive path.

17. The power source system according to claim 6, further comprising:
   a selection control unit configured to control a selection operation of the selection circuit; and
   an output abnormality detection unit configured to, if an output abnormality has occurred in any of the plurality of output circuits, detect the output circuit in which the output abnormality has occurred,
   wherein the selection control unit controls the selection circuit so as to cut off a flow of current between the output circuit in which the output abnormal has occurred and the first conductive path and second conductive path, and allow a flow of current between the output circuit in which the output abnormality has not occurred and at least one of the first conductive path and the second conductive path.

18. The power source system according to claim 7, further comprising:
   a selection control unit configured to control a selection operation of the selection circuit; and
   an output abnormality detection unit configured to, if an output abnormality has occurred in any of the plurality of output circuits, detect the output circuit in which the output abnormality has occurred,
   wherein the selection control unit controls the selection circuit so as to cut off a flow of current between the output circuit in which the output abnormal has occurred and the first conductive path and second conductive path, and allow a flow of current between the output circuit in which the output abnormality has not occurred and at least one of the first conductive path and the second conductive path.

* * * * *